(12) United States Patent
Winkler

(10) Patent No.: US 10,083,589 B2
(45) Date of Patent: Sep. 25, 2018

(54) METHOD AND DEVICE FOR MONITORING A PROTECTIVE GLASS

(71) Applicant: Scansonic MI GmbH, Berlin (DE)

(72) Inventor: Tammo Winkler, Berlin (DE)

(73) Assignee: Scansonic MI GmbH, Berlin (DE)

( * ) Notice: Subject to any disclaimer, the term of this patent is extended or adjusted under 35 U.S.C. 154(b) by 0 days.

(21) Appl. No.: 15/821,780

(22) Filed: Nov. 23, 2017

(65) Prior Publication Data

US 2018/0151048 A1 May 31, 2018

(30) Foreign Application Priority Data

Nov. 29, 2016 (DE) .................. 10 2016 123 000

(51) Int. Cl.

| | |
|---|---|
| *G08B 21/02* | (2006.01) |
| *B33Y 30/00* | (2015.01) |
| *B33Y 50/02* | (2015.01) |
| *B23K 26/21* | (2014.01) |
| *B23K 26/382* | (2014.01) |
| *B23K 26/70* | (2014.01) |
| *B22F 3/105* | (2006.01) |
| *B23K 26/03* | (2006.01) |
| *B23K 26/38* | (2014.01) |
| *G01M 11/02* | (2006.01) |

(Continued)

(52) U.S. Cl.
CPC ............ *G08B 21/02* (2013.01); *B22F 3/1055* (2013.01); *B23K 9/322* (2013.01); *B23K 26/034* (2013.01); *B23K 26/21* (2015.10); *B23K 26/38* (2013.01); *B23K 26/382* (2015.10); *B23K 26/705* (2015.10); *B23K 26/707* (2015.10); *B33Y 30/00* (2014.12); *B33Y 50/02* (2014.12); *F16P 1/06* (2013.01); *G01M 11/02* (2013.01); *B22F 2003/1056* (2013.01); *B22F 2003/1057* (2013.01); *B22F 2999/00* (2013.01)

(58) Field of Classification Search
CPC ........ G08B 21/02; B33Y 30/00; B33Y 50/02; B23K 26/21; B23K 26/382; B23K 26/705; B23K 26/707; B23K 9/322; B23K 26/034; B23K 26/38; B22F 3/1055
USPC ...................................................... 340/588
See application file for complete search history.

(56) References Cited

U.S. PATENT DOCUMENTS

| | | | | |
|---|---|---|---|---|
| 6,172,323 B1 * | 1/2001 | Ishide | ............ | B23K 26/1429 219/121.39 |
| 9,592,571 B2 * | 3/2017 | Oh | .................. | B23K 1/0056 |

(Continued)

FOREIGN PATENT DOCUMENTS

DE     10113518 A1    2/2002

*Primary Examiner* — Jack K Wang
(74) *Attorney, Agent, or Firm* — Michael Soderman

(57) ABSTRACT

The monitoring of protective glasses in laser machining heads, which are exposed to dust, sputtering and/or soiling, with the aim of predicting the contamination of the protective glass by way of determination of its absorption rate by means of temperature monitoring. The absorption rate is determined during laser processing by using a time-resolved temperature profile of the protective glass. Either, a difference of temporal temperature gradients being present before and after switching the working laser or an amplitude arising in a frequency spectrum of the temperature profile at the switching frequency of the laser is evaluated. Upon exceeding predetermined threshold values warning and error signals, respectively, are triggered.

11 Claims, 3 Drawing Sheets

(51) Int. Cl.
  *B23K 9/32*     (2006.01)
  *F16P 1/06*     (2006.01)

(56) References Cited

U.S. PATENT DOCUMENTS

| | | | |
|---|---|---|---|
| 9,868,179 B2* | 1/2018 | Toyosawa | B01J 19/12 |
| 2003/0011830 A1* | 1/2003 | Miyatake | G02B 13/24 |
| | | | 358/513 |
| 2004/0026389 A1* | 2/2004 | Kessler | B23K 26/032 |
| | | | 219/121.83 |
| 2010/0276403 A1* | 11/2010 | Reitemeyer | B23K 26/046 |
| | | | 219/121.67 |
| 2013/0165312 A1* | 6/2013 | Komai | C03C 1/00 |
| | | | 501/66 |
| 2016/0187201 A1* | 6/2016 | Wang | G01N 21/15 |
| | | | 356/318 |
| 2016/0279707 A1* | 9/2016 | Mattes | B41J 2/451 |
| 2016/0368091 A1* | 12/2016 | Takahashi | B23K 26/1476 |

* cited by examiner

METHOD AND DEVICE FOR MONITORING A PROTECTIVE GLASS

CROSS REFERENCE TO RELATED APPLICATIONS

This application claims the priority of DE 102016123000.6 filed on 2016 Nov. 29; this application is incorporated by reference herein in its entirety.

TECHNICAL FIELD

The invention relates to a method and an apparatus for checking the condition of a protective glass arranged at a laser optics in a laser machining system, which e. g. is used for joining of workpieces by means of a laser beam, with respect to becoming dirty, thus requiring a cleaning or replacement of the protective glass.

BACKGROUND

During joining, e. g. welding or soldering, or when cutting workpieces by means of a laser beam, splashes or flue gases are usually produced which can contaminate the laser processing head, in particular the glass for decoupling the laser beam onto the workpieces. On the one hand, an increase in turbidity reduces the amount of laser power available for the machining process. On the other hand, adhering splashes can deflect and/or scatter the laser beam, whereby the laser energy absorbed by the splash can lead to damage (e. g. melting, craters and cracks) or even to breakage of the protective glass.

Protective-glass monitors are known from the prior art which detect the temperature of the protective glass and generate an error signal when a temperature limit value is exceeded. For example, EP 1 310 782 A1 discloses determining the temperature by measuring an electrical resistance. A method of monitoring a protective glass, in which a temperature sensor detects a temperature of the protective glass and compares it with a reference temperature value, is described in DE 101 13 518 A1. It is proposed in DE 10 2004 006 565 A1 to measure a change in the length of an optical element and subsequently to determine a temperature change from the change in length.

A disadvantage of these monitoring devices is their dependence on the ambient temperature, i. e. in cold environments the monitoring may react too late, since a higher degree of contamination is necessary to trigger the error signal in comparison to warm environments.

Systems based on scattered light measurement are also known. For example, WO 98/33059 A1 describes such a method, wherein the scattered light generated by contamination is detected by means of a photodetector.

However, contamination monitoring by means of scattered light measurement shows dependencies on the type of contamination (absorption or reflection of the measuring light) as well as on the position of the contamination on the protective glass. Also, it may be difficult to separate the scattered light from stray light resulting from the process, so monitoring may be unreliable.

DE 203 14 918 U1 shows a device for monitoring a protective glass of a laser optic for breakage and/or contamination, wherein at least one photodetector, which is arranged on the circumference of the end face of the protective lens and is connected to an evaluation device, is provided, to which at least one electromagnetic radiation source is assigned, the electromagnetic radiation of which is coupled via the end face of the protective glass. However, this device only detects disturbances occurring in the glass, and surface contaminants are hardly detectable.

SUMMARY

It is an object of the invention to avoid the above-mentioned disadvantages, such as a dependency of the contamination monitoring on the ambient temperature, by creating a method that can be used for any kind of (light-absorbing) pollution and a protective glass monitoring device that is both, insensitive to interference as well as inexpensive.

The object of the invention is achieved by the methods having the features of the independent claims 1 and 2 as well as by the device having the characterizing features of claim 7. Further advantageous embodiments of the invention result from the dependent claims. A particularly advantageous use is shown in claim 10.

DETAILED DESCRIPTION

According to the invention, the methods provided for monitoring a protective glass of a laser processing device for contamination comprise a time-resolved detection of the temperature profile of the protective glass (i.e., a temperature value is recorded at specified intervals of e. g. one millisecond and stored together with the acquisition time) during the laser processing process, as well as, if appropriate, before and after, and the determination of the influence of the switching times of the laser power, in particular of the on and off states, of the working laser on this temporal temperature profile. It is assumed that the working laser can be switched on and off frequently during processing, for example in order to achieve sudden positional changes of the laser beam spot ("Tool Center Point"—TCP) on the surface of the workpiece to be machined.

Hence, "switching" the laser power denotes a (sudden) change (increase or decrease, and particularly including the switching on and off of the working laser) of the laser power.

According to a first aspect of the invention, a temporal temperature gradient (i.e., a temporal change in temperature, for example, a temperature rise or a temperature drop) of the temperature of the protective glass is determined continuously. This (currently determined) temperature gradient is compared with a temperature gradient that by a predefined time interval has been determined in the past (i. e. determined at a time in the past) by calculating the difference between the two temperature gradients.

In case of a power change of the working laser (e. g. when switching on or off) the magnitude of the difference between the two temperature gradients shows a (for example sudden) increase since e. g. a first temperature gradient, which lies back by the given time interval, has a positive value shortly before switching off and a second, currently determined temperature gradient shows a negative value shortly after switching off the working laser. In particular, the time of a change in the working laser power can thus be narrowed down.

The magnitude of the difference between the two temperature gradients to a first approximation is independent of the ambient temperature of the protective glass, since this temperature is eliminated in the mathematical expression of the difference between the two temperature gradients, as will be shown in the following.

Furthermore, the difference between the temperature gradients is proportional to the laser power absorbed by the protective glass. It is assumed that contamination and defects (e. g. burn-in) of the protective glass will lead to an absorption of irradiated laser light, i. e. a conversion of light energy into heat energy. This in turn results in heating of the protective glass.

In order to be able to reliably measure the heating of the protective glass occurring due to absorption of the laser light, the protective glass is in accordance with the invention held by a protective glass holder, which has a low thermal conductivity of e. g. less than 1.5 W/(m·K), i. e. the protective glass is thermally insulated to a large extent from the laser processing head.

Due to this low thermal conductivity of the protective glass holder, only a small amount of heat energy, which is introduced into the protective glass through absorption of the laser light, is dissipated by heat conduction per unit of time.

The power input leading to the heating of the protective glass is equal to the difference between the power absorbed by the working laser and the power dissipated to the environment by the protective glass. Let $R_{th}$ be the heat resistance between the protective glass and the environment (i.e. between the protective glass and the body of the laser processing optics), $C_{th}$ the heat capacity of the protective glass, T the temperature (dependent on time) of the protective glass, $T_{Ko}$ the temperature of the body of the laser processing optics and $P_{in}$ the laser power absorbed by the protective glass and its contaminations, respectively. Then, the resulting power input $P_{th}$ into the protective glass calculates to:

$$P_{th}=C_{th}\cdot dT/dt=P_{in}-(T-T_{Ko})/R_{th} \quad (1)$$

After switching the laser power (increasing or decreasing by a factor a, wherein in particular the switching on and off of the working laser is to be included here) the following applies to the introduced power:

$$P_{in,Sw}=a\cdot P_{in}$$

Thus, the following two equations yield for the state before and after switching the working laser from one output power to another output power.

$$C_{th}\cdot dT_B/dt=P_{in}-(T_B-T_{Ko})/R_{th} \quad (2)$$

$$C_{th}\cdot dT_A/dt=a\cdot P_{in}-(T_A-T_{Ko})/R_{th} \quad (3)$$

The measured values are the first temperature gradient $dT_B/dt$, which is captured immediately before switching the laser power of the working laser (at a time $t_B$), and the second temperature gradient $dT_A/dt$, which is captured (at a time $t_A$) immediately after switching the laser power of the working laser. In the case that the times at which the temperature gradients are captured only deviate from each other for a short period of time (i. e. $t_B \approx t_A$) the two protective glass temperatures $T_B$ and $T_A$ in a good approximation may be set equal, i.e.

$$T_B \approx T_A \quad (4)$$

Subtracting equations (2) and (3) from each other by regarding the equality of $T_B$ and $T_A$ results in an absorbed laser power being proportional to the absolute value of the so-called "temporal-variation-value", which denotes the difference of the temperature gradients:

$$|dT_B/dt-dT_A/dt|=(1/C_{th})\cdot P_{in}\cdot|1-a| \quad (5)$$

Hence, the temporal-variation-value, i.e. the difference of the temperature gradients determined shortly before switching and shortly after switching the working laser, reveals to be a measure for the power input into the protective glass and, consequently, for the amount of contamination of the protective glass.

When the working laser is completely switched off (for example, at the end of a joining process), the factor a is zero; the equation (5) is then simplified to:

$$|dT_B/dt-dT_A/dt|=(1/C_{th})\cdot P_{in} \quad (6)$$

According to equation (6) the difference of the temperature gradients captured shortly before switching off and shortly after switching off the working laser are a measure for the contamination of the protective glass.

According to the invention, a first and a second threshold value are defined for the difference of the temperature gradients, the second being greater than the first threshold value. The first threshold value defines a warning value, wherein a warning signal is generated when the absolute value of the temperature gradient difference $|dT_B/dt-dT_A/dt|$ is exceeding this first threshold value, i.e. an exceeding of the first threshold value triggers a warning signal.

When the second threshold value is exceeded, an error signal, preferably a stop signal, is output. This error signal can, for example, cause a shutdown of the working laser.

According to a second aspect of the invention, the detected time-resolved temperature profile is subdivided into individual time sections by specifying time events. Each time a specified time event occurs, the temperature profile recorded since the previous time event (or start of measurement) is subjected to a frequency analysis. The frequency analysis is preferably performed by means of a frequency transformation (e. g. a discrete Fourier transformation using the well-known FFT (Fast Fourier Transformation) algorithm or wavelet transformation).

Frequency transformation is understood here to be an integral transformation by means of which a time-dependent signal can be mapped from the time space into the frequency space, i.e. a transformation in order to generate a frequency spectrum.

The discrete frequency spectrum obtained by the frequency transformation is analysed in the range of the on-/off frequency of the working laser with respect to an amplitude (Fourier coefficient) increasing with each newly generated frequency spectrum.

If, in successive frequency spectra, the amplitude of the switching frequency of the working laser grows from frequency spectrum to frequency spectrum (i.e., from calculation to calculation), a temperature variation of the protective glass with precisely this on/off frequency is indicated. This in turn implies a continuously increasing absorption of laser radiation by e.g. contaminations present on the surface of the protective glass.

In this embodiment of the method as well, a first threshold value and a second threshold value, which is greater than the first, are set, which herein are threshold values of the amplitude. The first (amplitude) threshold value defines a warning value, wherein a warning signal is generated when the amplitude is exceeding this first threshold value. Upon exceeding the second threshold value an error signal, preferably a stop signal, is output, which e.g. leads to a shutdown of the working laser.

The advantage of the method according to the invention is its independency of the temperature of the body of the laser processing optics. The method is working fast in that an instantaneous warning and error signaling is made possible. Besides, no complex hardware, like e.g. a camera comprising an image recognition system, is required.

The temperature of the protective glass may be detected either in contact, i.e. by means of a temperature sensor affixed onto the protective glass, or contact-less, e.g. by means of a radiation sensor.

Further, it may be provided to output the warning signal permanently after its first occurrence—until is it reset e.g. manually—or only during the time period during which the warning state is detected according to the method (in that the warning signaling e. g. may switched on and off several times—depending on the result of each recurring evaluation).

According to a variant of the method several temperature sensors may be used—e.g. located at different positions of the protective glass—each sensor capturing a time-resolved temperature profile. According to this variant it may be provided to already trigger a warning signal or an error signal, when the evaluation of a temperature profile captured by only one of these sensors is fulfilling the condition for triggering the signal. In order to provide statistical support it may also be provided to trigger a warning or error signal only when in the temperature profiles of at least two sensors an exceeding of a respective threshold value is detected. A mean value formation via a plurality of sensors can also be provided.

The device according to the invention comprises at least one temperature sensor as well as an evaluation unit connected to these sensors, wherein the evaluation unit additionally may comprise an interface for connecting to a control and regulating unit of a laser processing device, the protective glass of which is to be monitored.

The evaluation unit is set up to perform one or both of the two embodiments of the method according to the invention based on the temporal temperature profiles detected by means of the temperature sensor(s). A combination with other algorithms and measurement data, for example the monitoring of the absolute temperature of the protective glass, is also conceivable.

The advantage of the monitoring device is that it is constructed from a small number of low-cost components. Hence, the space required for the monitoring device is small; it may be integrated into practically every laser processing head (also retrospectively, if the temperature sensor is applied e. g. on the outside of the protective glass, which is accessible from the outside).

It may be provided that the evaluation unit comprises an optical and/or acoustic signaling device, which optically and acoustically, respectively, transmits the warning and the error signal to an operator of the laser processing device.

Furthermore, the warning and the error signal may be issued via an interface and thus e.g. transmitted to the laser processing device in that the processing laser may be switched off in case of an error situation in order to prevent damage to the protective glass.

According to an embodiment the temperature sensor is a thermistor, i.e. a variable electrical resistance, the value of which changes reproducibly with temperature.

Furthermore, the temperature measurement can be carried out without contact by means of a thermoelectric sensor, i. e. a sensor consisting of thermocouples, which generates a voltage dependent on the emitted heat radiation. Such an embodiment simplifies the thermal connection to the protective glass and thus makes a simple change of the protective glass possible.

In one embodiment of the monitoring device, the evaluation unit is configured to permanently output the warning signal and/or the stop signal after its respective occurrence, wherein the evaluation unit comprises a manually operable user interface, e.g. a pressable button, by means of which a resetting of the warning and the stop signal is made possible. Thus, the respective signal is output as long as an operator or a customer engineer of the laser processing device deliberately resets the signal, e. g. after having exchanged the protective glass.

Advantageously, the monitoring device can be arranged in an optical system, i.e. in a laser processing optics, wherein the at least one temperature sensor is directing towards the surface of a protective glass lined by a protective glass holder, the surface of the protective glass facing the optical system, and the temperature sensor being arranged directly next to the protective glass holder. The protective glass holder used herewith on its one side consists of a material of low thermal conductivity, e. g. Teflon.

BRIEF DESCRIPTION OF THE DRAWINGS

The invention is explained in more detail below with the aid of exemplary embodiments with reference to the figures, the same or similar features being provided with the same reference numerals; schematically shown therein are.

DETAILED DESCRIPTION OF THE PREFERRED EMBODIMENTS

Figure 1:
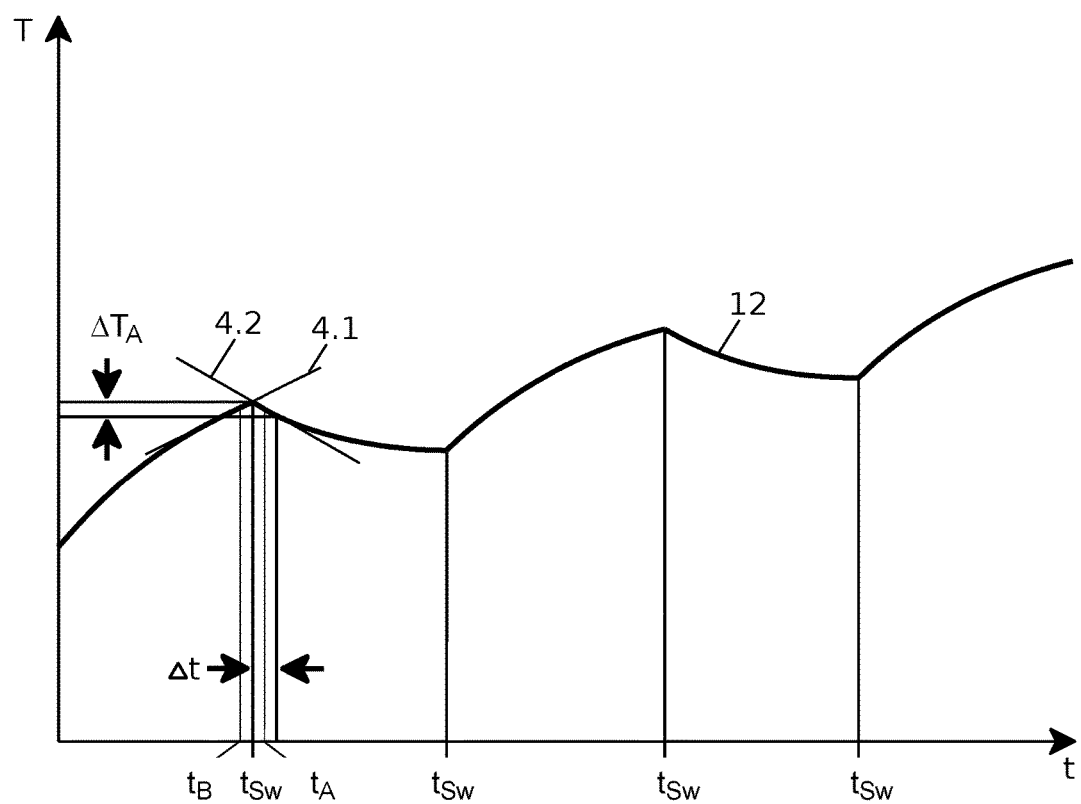
FIG. 1 the principle of the method according to a first embodiment.

For the first embodiment of the method for monitoring a protective glass, the time-resolved temperature profile 12 shown in FIG. 1 is captured, wherein parallel to capturing the temperature the temporal temperature gradient is determined and stored for at least a given time period of $2 \cdot \Delta t$. In this way, therefore, the corresponding temperature differences $\Delta T_B$ occurring before the time $t_{Sw}$ of switching the laser (in this example a periodic increase and decrease of the laser power) and $\Delta T_A$, which is present after the switching time $t_{Sw}$ of the laser, are determined for the specified time interval $\Delta t$. These temperature differences then are assigned to the times $t_B$ and $t_A$, respectively.

The temperature gradient $dT_A/dt$ 4.2 existing at the time $t_A$ is, as shown in FIG. 1, approximated by the formation of the difference quotient from the temperature difference ATA and the time interval $\Delta t$. In the same way the temperature gradient $dT_B/dt$ 4.1 is determined for the time $t_B$. The difference of the temperature gradients 4.1 and 4.2 then is calculated according to equation (6):

$$dT_B/dt - dT_A/dt = \Delta T_B/\Delta t - \Delta T_A/\Delta t \quad (7)$$

Figure 2A:
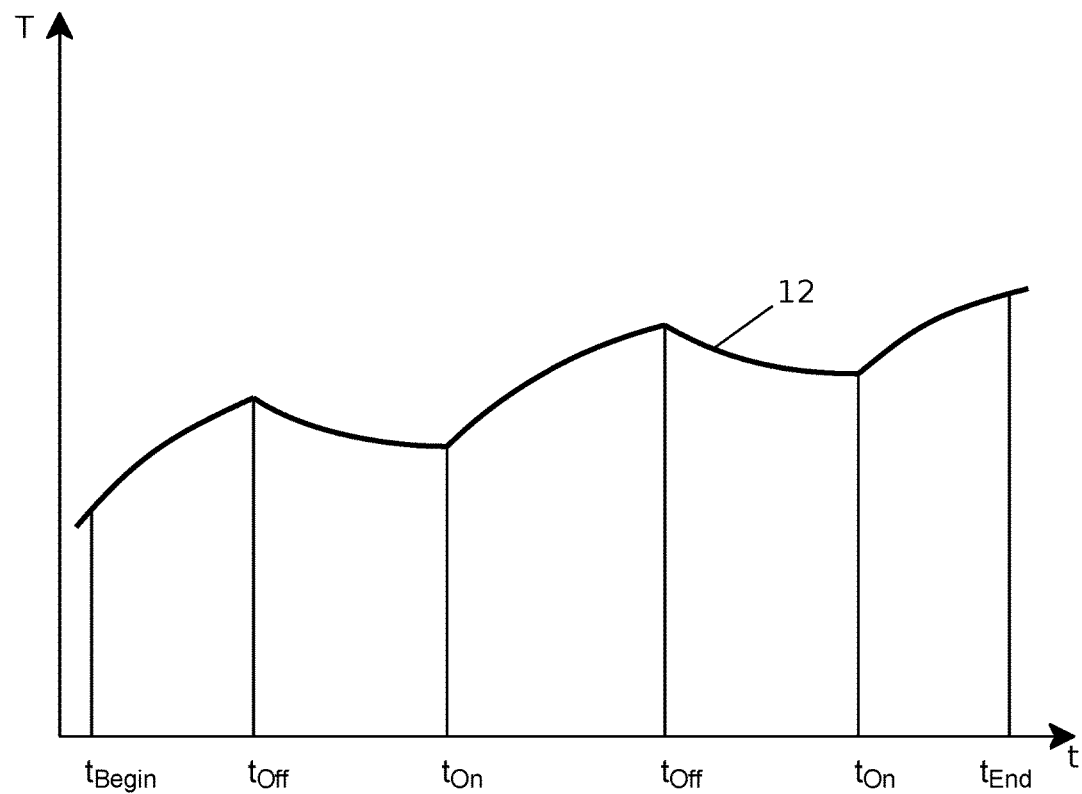
FIG. 2A, 2B the principle of the method according to a second embodiment.
Figure 2B:
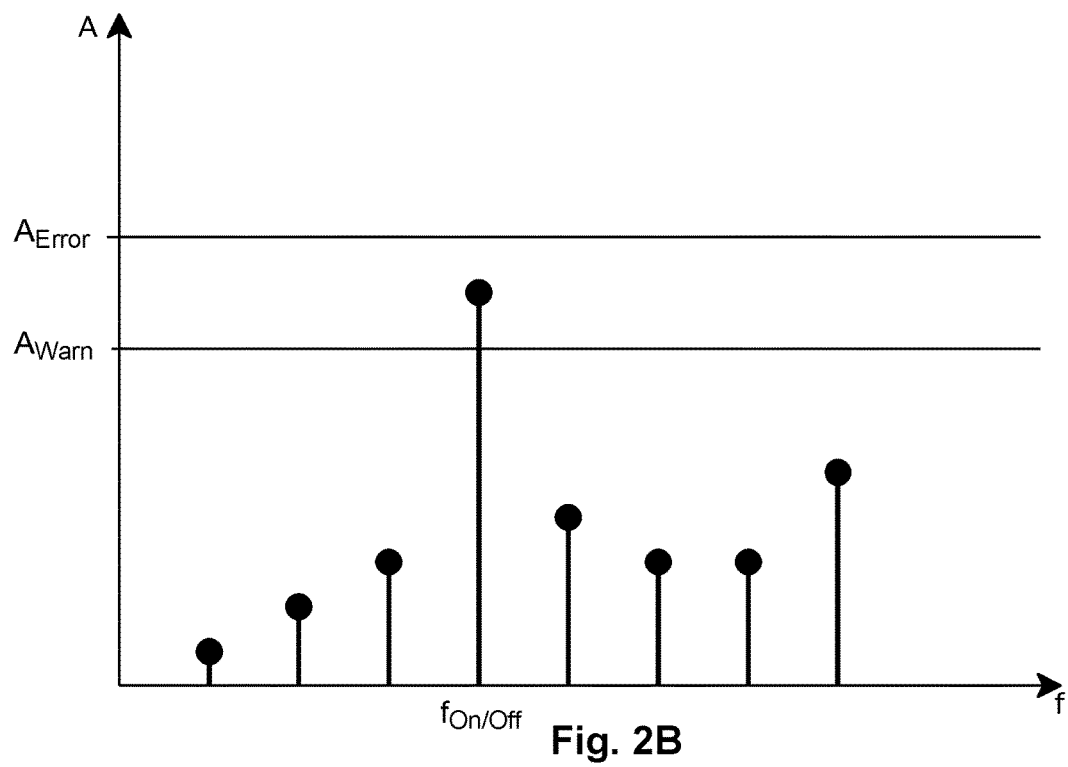

For the second embodiment of the method for monitoring a protective glass, from the time-resolved temperature profile 12 shown in FIG. 2A for the time interval between the times $T_{Begin}$ and $t_{End}$ the discrete frequency spectrum shown in FIG. 2B is being calculated by FFT (Fast Fourier Transform). The amplitude A, which was calculated for the frequency $f_{On/Off}$ is compared to the threshold values $A_{Warn}$ for the warning signal and $A_{Error}$ for the error signal. The amplitude A, as shown in FIG. 2B, exceeds the threshold value $A_{Warn}$, so that a warning signal is generated.

Figure 3:
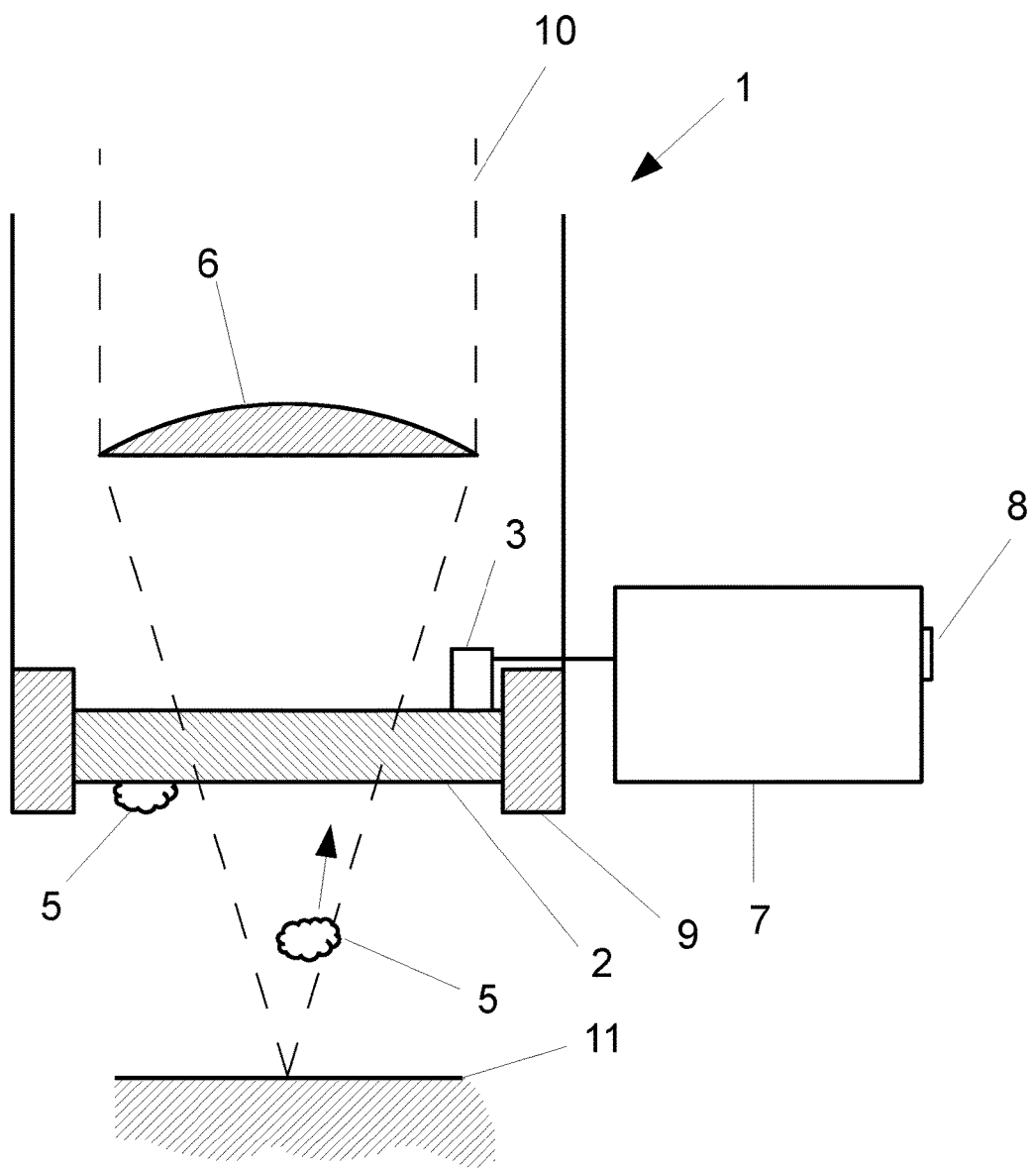
FIG. 3 a laser processing head with monitoring device.

FIG. 3 shows the laser processing head 1 with the optical system 6 (only the focusing lens of a laser processing system is shown here). The laser beam 10 is decoupled from the laser processing head 1 by the protective glass 2 held by the protective glass holder 9 and is focused onto the workpiece 11 by means of the optical system 6. During the process of laser processing, contaminants 5 reach the protective glass 2. The temperature sensor 3 is measuring the temperature of the protective glass 2 and transmits the measured values to the evaluation unit 7. This unit 7 processes the time-resolved temperature of the protective glass 2 with the aid of data related to the switching states of the laser (not shown), provided by a control and regulating unit (not shown) of the laser processing head 1 via the interface 8. By this way, an assessment of the energy input into the protective glass 2 caused by the contaminations 5 is accomplished. Via interface 8, the warning or error signal is sent to the control and regulating unit (not shown).

The invention is not limited to the examples that have been described above but can be varied within the scope of the accompanying claims. Also, the invention can be combined with different methods for preventing dirt to collect on the protective glass surface, for instance cross jet or axial blow methods.

LIST OF REFERENCE NUMERALS 1 laser processing head
2 protective glass
3 temperature sensor
3.1 temporal temperature gradient temperature gradient before switching
4 temperature gradient after switching contamination
5 optical system
6 evaluation unit
7 interface for connection to a control and regulating unit
8 protective glass
9 laser beam
10 workpiece
11 time-resolved temperature profile
12 (discrete) frequency spectrum
T temperature
t time
ΔT temperature difference
Δt time difference
$T_A$ current temperature of the protective glass
$T_B$ protective glass temperature at an earlier time
$t_A$ current time/time after switching the laser
$t_B$ time before the current time/time before switching the laser
$t_{Off}$ time of shutting off the laser
$t_{On}$ time of switching on the laser
$t_{Sw}$ time of switching the laser
$t_{Begin}$ starting time of a time interval
$t_{End}$ ending time of a time interval
A amplitude
$A_{Warn}$ threshold value for warning signal
$A_{Error}$ threshold value for error signal
f frequency
$f_{On/Off}$ switching frequency of switching on and off the laser

The invention claimed is:

1. A method for monitoring a protective glass of a laser processing device with respect to contamination (5), characterized by the following steps:
capturing a time-resolved temperature profile (12) of the protective glass (2) by means of at least one temperature sensor (3) during laser processing;
acquiring a temperature gradient (4) as a function of time (t) from the temperature profile (12) of the protective glass (2), said temperature gradient (4) having a first temperature gradient value (4.1) at a first time ($t_B$) and a second temperature gradient value (4.2) at a second time ($t_A$), wherein said first time ($t_B$) is a predetermined period of time prior to the second time ($t_A$);
determining a temporal-variation-value by subtracting the second temperature gradient value (4.2) from the first temperature gradient value (4.1), said temporal-variation-value being indicative of a change of the temperature gradient (4) in time;
generating a warning signal, if the absolute value of the temporal-variation-value exceeds a predetermined first threshold value; and
generating an error signal, if the absolute value of the temporal-variation-value exceeds a predetermined second threshold value, said second threshold value being larger than the first threshold value.

2. A method for monitoring a protective glass of a laser processing device with respect to contamination (5), characterized by the following steps:
capturing a time-resolved temperature profile (12) of the protective glass (2) by means of at least one temperature sensor (3) during laser processing;
creating a frequency spectrum (13) by applying frequency transformation to the time-resolved temperature profile (12), said frequency spectrum (13) having an amplitude (A) for every frequency;
generating a warning signal, if the frequency spectrum (13) of the temperature profile (12) shows at frequencies being excited by the working laser an amplitude (A) exceeding a predetermined first amplitude threshold value ($A_{Warn}$); and
generating an error signal, if the frequency spectrum (13) of the temperature profile (12) shows at frequencies being excited by the working laser an amplitude (A) exceeding a predetermined second amplitude threshold value ($A_{Error}$), said second amplitude threshold value ($A_{Error}$) being larger than the first amplitude threshold value ($A_{Warn}$).

3. The method for monitoring according to claim 1, characterized in that the time-resolved temperature profile (12) of the protective glass (2) is captured by use of at least one temperature sensor (3), said at least one temperature sensor (3) contactless detecting heat radiation emitted from the protective glass (2).

4. The method for monitoring according to claim 1, characterized in that the time-resolved temperature profile (12) of the protective glass (2) is captured by use of at least one temperature sensor (3) contacting the protective glass (2), said protective glass (2) being hold by a protective glass holder (9), wherein the at least one temperature sensor (3) is positioned in contact to the protective glass (2) at a position in the vicinity of the protective glass holder (9).

5. The method for monitoring according to claim 1, characterized in that at least two temperature sensors (3) are being used, each temperature sensor (3) capturing a respective time-resolved temperature profile (12), wherein a warning signal is triggered, if an exceeding of the first threshold value ($A_{Warn}$) for any of said temperature profiles (12) is detected, and an error signal is triggered, if for any of said temperature profiles (12) an exceeding of the second threshold value ($A_{Error}$) is detected.

6. The method for monitoring according to claim 1, characterized in that after triggering the warning signal said warning signal is reset, if the absolute value of the temporal-variation-value falls below the first threshold value.

7. The method for monitoring according to claim 2, characterized in that after triggering the warning signal said warning signal is reset, if the amplitude (A) falls below the predetermined first amplitude threshold value ($A_{Warn}$).

8. A device for monitoring a protective glass of a laser processing device with respect to contamination (5), said laser processing device having a working laser and a control and regulating unit,
characterized in that
said device for monitoring comprises at least one temperature sensor (3) and an evaluation unit (7) connected to said temperature sensors (3), said evaluation unit (7) additionally comprising an interface (8) for connecting to the control and regulating unit of the laser processing device,
wherein said evaluation unit (7) is capable of receiving data concerning switching times ($t_{Sw}$) of a laser power of the working laser of the laser processing device via the interface (8),
wherein the evaluation unit (7) on the basis of a time-resolved temperature profile (12) captured by means of the at least one temperature sensor (3) and said data received via the interface (8) is set up to
calculate a difference of temporal temperature gradients (4.1, 4.2), said temporal temperature gradients (4.1, 4.2) occurring in the time-resolved temperature profile (12) immediately before and after said switching times ($t_{Sw}$) of the working laser, and/or
calculate a discrete Fourier transform of the temperature profile (12) for a given period of time, and
trigger a warning signal if said difference of the temporal temperature gradients (4) exceeds a first predetermined threshold value or if in the Fourier transform the amplitude (A) at the switching frequency of switching the working laser, said switching occurring during said given period of time, exceeds a predetermined first amplitude threshold value ($A_{Warn}$), and,
output an error signal via the interface (8), if the difference of the temporal temperature gradients (4) exceeds a predetermined second threshold value or if the amplitude (A) in the Fourier transform at the switching frequency of switching the working laser exceeds a predetermined second amplitude threshold value ($A_{Error}$).

9. The device for monitoring according to claim 8, characterized in that the temperature sensor (3) is a radiation-detecting sensor capable of contactless detecting heat radiation.

10. The device for monitoring according to claim 8, characterized in that the evaluation unit (7) is set up to output the warning and/or error signal permanently upon first occurrence, wherein said evaluation unit (7) comprises a manually operable user interface, by means of which the warning and/or error signal is resettable.

11. Use of the monitoring device according to claim 8 in a processing head (1) of a laser welding device, said laser welding device comprising an optical system (6) protected by the protective glass (2) being hold by a protective glass holder (9), said protective glass (2) having a surface facing towards the optical system (6), wherein the at least one temperature sensor (3) is positioned in contact to the protective glass (2) on said surface at a position adjacent to the protective glass holder (9).

* * * * *